** 3,458,520
DEHYDROGENATION AND CYCLISATION OF
AMINES
William Hamilton Bell and Robert Allan Campbell
Rennie, Runcorn, and Roy John Sampson, Norton-on-Tees, England, assignors to Imperial Chemical
Industries Limited, London, England, a corporation of Great Britain
No Drawing. Filed Dec. 20, 1965, Ser. No. 515,204
Claims priority, application Great Britain, Dec. 24, 1964,
52,464/64
Int. Cl. C02d 31/04, 33/18
U.S. Cl. 260—290         6 Claims

ABSTRACT OF THE DISCLOSURE

A process for the preparation of pyridine or a hydrocarbyl substituted pyridine, wherein an aliphatic, nitrogen-containing compound, particularly a primary or secondary amine, or an imine, containing at least five carbon atoms is dehydrogenated and cyclized by heating with iodine in the vapor phase, preferably in the presence of an inorganic metal oxide which will take up the hydrogen iodide formed.

---

This invention relates to the dehydrogenation of nitrogenous compounds with a halogen to form aromatic heterocyclic compounds containing nitrogen in the ring. It relates especially to the dehydrogenation and cyclisation of open chain compounds with iodine to form pyridine or substituted derivatives thereof.

It is known from U.K. specification Nos. 793,135, 793,-214 and 793,215 that aliphatic hydrocarbons can be dehydrogenated by heating with iodine to form a variety of aromatic and/or ethylenically-unsaturated hydrocarbons, often with some rearrangement of the molecular structure. It is also known from U.K. specification Nos. 796,048, 895,500 and 973,564 that the dehydrogenation of hydrocarbons can be carried out in the presence of metals or their derivatives which can be converted to iodide by the hydrogen iodide by-product, thus enabling iodine to be recovered. The addition of oxygen to the dehydrogenation reaction mixture to regenerate the iodine is also known from U.K. specification No. 798,254, and U.K. specification No. 911,212 describes the use of selected iodides (particularly lithium iodide) as a melt through which a mixture of hydrocarbon and oxygen can be passed to form the olefinic product.

We have found that nitrogenous compounds can be dehydrogenated to form aromatic heterocyclic compounds having nitrogen in the ring.

Accordingly the present invention provides a vapour phase dehydrogenation process for the production of aromatic compounds having nitrogen in the ring which comprises heating a halogen with an aliphatic nitrogenous compound containing a sufficient number of carbon, nitrogen and hydrogen atoms in an appropriate arrangement to form the aromatic compound after dehydrogenation.

Within the term "aliphatic" we wish to include open chain aliphatic and alicyclic compounds containing nitrogen in the ring, i.e., compounds which are saturated or only partially unsaturated thus permitting dehydrogenation to an aromatic compound. We do not wish to exclude the possibility of aromatic substituents being attached to the aliphatic part of such a compound. A preferred halogen is iodine. Within the term "iodine" we wish to include cases in which iodine is formed in situ, i.e., sources of iodine which yield iodine under the reaction conditions.

The process of the invention is especially applicable to the dehydrogenation of aliphatic nitrogenous compounds containing an open chain of carbon and nitrogen atoms, appropriate atoms in the chain having sufficient hydrogen atoms to permit cyclisation to occur on dehydrogenation to form the aromatic compound. Thus preferred starting materials are exemplified by primary and secondary amines and imines notionally derived therefrom which have hydrogen atoms on the carbon or nitrogen atoms which take part in the formation of the cyclising bond. Compounds such as nitriles and isonitriles having five carbon atoms and no hydrogen atoms on the terminal carbon or nitrogen atom do not readily undergo cyclisation.

The appropriate starting material for any given product will be readily ascertainable by one skilled in the art from a knowledge of the structure of the desired product. Thus if the starting material contains one nitrogen atom then the product will usually be pyridine or a substituted derivative thereof. Simple starting materials with only five carbon atoms, one nitrogen atom and a sufficient number of hydrogen atoms will form pyridine itself. More complex starting materials will form substituted derivatives of pyridine. Preferably the nitrogen atom is bonded to not more than two carbon atoms, since this eliminates the need for a "cracking" type reaction to occur or some rearrangement of groups around the nitrogen atom. Suitable starting materials include primary or secondary amines or imines notionally derived therefrom. Suitable substituents which lead to the production of substituted pyridines may include for example alkyl, halogen, hydroxyl or pyridyl radicals or combinations of these. Using isopropylidene isopropylamine for example, $\alpha$-picoline is obtained and using appropriately substituted starting materials compounds of the quinoline, isoquinoline of dipyridyl series may be obtained. Depending upon the conditions used for the reaction however the substituent itself may undergo change for example dehydrogenation (e.g., an ethyl group may be converted to a vinyl group), or may be removed by a "cracking" reaction. As will be apparent, the starting compounds used herein may also be defined as primary, secondary or tertiary alkyl amines or alkyl alkylidene amines wherein the amines have at least 5 carbon atoms and each alkyl or alkylidene group therein has no more than 5 carbon atoms.

The starting materials may be formed in situ from suitable simpler precursors which together provide the required structure to form the aromatic heterocyclic compound after combination and dehydrogenation. Examples are provided by the use of aliphatic aldehydes and primary amines which condense to form imines, e.g., acetaldehyde and propylamine which form ethylidene propylamine. Higher yields are obtained if the precursors are mixed before reacting with iodine although some desired product may be formed if the precursors and iodine are mixed together in the reaction vessel.

Temperatures should be high enough to maintain the reactants in the gaseous phase. Temperatures in the range 300° C. to 800° C. and preferably 350° C. to 650° C. are convenient. Outside this range yields decrease and difficulties may be encountered with clogging of the apparatus or undesired side reactions.

The proportion of iodine to be used may vary considerably, but need not be greater than that theoretically equivalent to the hydrogen to be removed from the starting material in the reaction though greater proportions may be used if desired. In the case of an aldimine, for example ethylidene propylamine, in which the reaction is essentially that of forming the pyridine ring without extraneous reactions involving loss of hydrogen, the theoretically required maximum proportion of iodine is 3 moles per mole of the aldimine (equivalent to the 3 moles of hydrogen to be removed in the formation of the pyridine ring). If other reactions occur, for example dehydrogenation of substituents (e.g., ethyl or vinyl), this must be allowed for in the calculation. In practice, however, much smaller proportions may be found to act quite efficiently, though the exact mechanism of reaction is not clear. Some of the iodine is converted into hydrogen iodide, and hydrogen may be formed as a component of the reaction mixture and/or may be taken up by other components such as simple olefins which may be present in the reaction mixture, to form reduced products. When reaction conditions are used in which the iodine is regenerated in situ, however, smaller proportions are quite satisfactory.

The iodine and the starting material may conveniently be mixed together directly in the vapour state and one or both of the two reactants may be deluted with an inert gas, for example nitrogen. Steam may also be present. Oxygen may also be present in the reaction stage, being added admixed with a reactant feed or as a separate feed.

The process may also be carried out in the presence of catalysts, and particularly in the presence of metals, metal oxides or metal derivatives (for example platinum, nickel oxide, iron oxide, manganese oxide, or mixtures thereof) which can take up the hydrogen iodide formed as byproducts or can assist regeneration of iodine from the hydrogen iodide. When such catalysts are used they will normally be present as solids and dehydrogenation will occur partly at the catalyst surface. This should be borne in mind when interpreting the expression vapour phase as used herein. The iodine may be regenerated by conventional means from the metal iodides as a separate step if desired, for example by heating in an oxidising atmosphere, and the iodine may be re-used either in the vapour or in a condensed form.

As an alternative to using a direct feed of iodine to the reactor, the reactor may contain a material which can generate iodine in situ, for example a metal iodide (especially lead or cadmium iodide in molten form) which can react with oxygen to form iodine, and then feeding the starting material and oxygen into this reactor, so that a mixture of oxygen and the nitrogenous starting material is in intimate contact with the metal iodide.

The product of the reaction can be isolated using conventional methods. Pyridine for example can be trapped in water and steam distilled.

Examples of the invention will now be described, Example 19 being a comparison experiment.

Example 1

Iodine (8.95 g.) and ethylidene propylamine (0.6 g.) were introduced, entrained in nitrogen (20 and 5 litres respectively) as two separate feeds to a glass reactor of the design described by Mullineaux et al. at p. 3175 of the Journal of the American Chemical Society (1963), volume 85. The two gas streams were preheated to 400° C. in the upper section of the reactor and then mixed in the reaction zone at the same temperature. The residence time in the reactor zone was approximately 1 second. The emerging vapour was washed with caustic soda solution and steam to remove iodine and hydrogen iodide and then bubbled through a vessel containing cold water. This water, containing dissolved products, was then steam distilled and several fractions of distillate were collected and analysed by gas-liquid chromatography and ultraviolet spectroscopy.

Pyridine (0.075 g.) was detected in the distillate, together with some unchanged ethylidene propylamine. Approximately 47% of the iodine reacted, according to the calculations based on titrations of the aqueous caustic soda solution used for washing the product gas stream.

Example 2

Iodine (5.77 g.) and ethylidene propylamine (0.6 g.) entrained in nitrogen (18.3 litres and 4.5 litres respectively) were passed through the furnace as above at 500° C. The reaction time was 1.8 seconds. The weight of pyridine given was 0.17 g.

Examples 3–23

A series of runs was performed at atmospheric pressure in an empty tubular reactor, the organic reactants and iodine being led in separately through tubes preheated to the reaction temperature and mixed in the reactor. Details are listed in Table I. Yields are of pyridine unless otherwise stated.

The flow rates quoted refer to nitrogen at 25° C. which is then passed through the reactants at a suitable temperature to give the partial pressures of reactants quoted in the table.

The reactor volume was about 200 ml.

TABLE I

| Ex. | Organic Reactant | Temp. (° C.) | Residence Time (sec.) | Yield [1] (percent) | Comments | I₂ flow (cc./min.) | Organic Reactant flow (cc./min.) | I₂ press. (mm.) | Organic Reactant press. (mm.) |
|---|---|---|---|---|---|---|---|---|---|
| 3 | Propylidene ethylamine | 500 | 7.0 | 3.8 | Reactor blocked—indication of formation of picoline(s) on U.V. | 750 | 100 | 44 | 105 |
| 4 | do | 400 | 9.0 | 10.7 | | 750 | 100 | 44 | 105 |
| 5 | do | 300 | | | | 750 | 100 | 44 | 105 |
| 6 | do | 700 | 1.8 | 2.6 | | 1,500 | 200 | 44 | 105 |
| 7 | Ethylidene propylamine | 300 | 3.0 | 0.75 | Some picolines in product | 1,500 | 200 | 44 | 110 |
| 8 | do | 400 | 2.6 | 14.7 | | 1,500 | 200 | 44 | 1110 |
| 9 | do | 500 | 2.2 | 9.6 | | 1,500 | 200 | 44 | 110 |
| 10 | Ethylidene propylamine | 500 | 12 | 14.7 | I₂ ⅒ stoichiometric | 150 | 200 | 44 | 110 |
| 11 | Ethylidene propylamine | 600 | 2.0 | 13.0 | | 1,500 | 200 | 44 | 110 |
| 12 | do | 700 | 1.8 | 5.9 | | 1,500 | 200 | 44 | 110 |
| 13 | Propylidene propylamine | 500 | 2.3 | 1.7 | β-picoline by U.V. | 1,500 | 190 | 44 | 100 |
| 14 | do | 500 | 7.0 | 0.9 | | 1,430 | 117 | 44 | 100 |
| 15 | Isopropylidene propylamine | 500 | 7.0 | 23.7 | α-picoline by U.V. | 750 | 102 | 44 | 115 |
| 16 | Ethyl propylamine | 500 | 2.2 | 7.7 | | 1,500 | 200 | 44 | 95 |
| 17 | Amylamine | 500 | 2.2 | 26.5 | | 1,500 | 210 | 44 | 105 |
| 18 | do | 400 | 2.6 | 30.0 | | 1,500 | 210 | 44 | 105 |
| 19 | Valeronitrile | 500 | 2.2 | Nil | | 1,500 | 240 | 44 | 110 |
| 20 | Ethylamine and propionaldehyde. | 500 | 2.2 | Trace | Amine, aldehyde and iodine mixed in situ i.e. in hot reactor. | 1,500 | 56.5 / 209 | 44 | 370 / 100 |
| 21 | Ethylamine and propionaldehyde. | 500 | 2.3 | 9.9 | Preformed Schiff's Base from aldehyde and amine just before mixing with I₂. | 1,500 | 56.5 / 209 | 44 | 370 / 100 |
| 22 | Acetaldehyde and propylamine. | 500 | | 3.3 | Preformed Schiff's Base from aldehyde and amine just before mixing with I₂. | 1,500 | 57 / 61.2 | 44 | 340 / 320 |
| 23 | N,N dimethyl butylamine | 500 | | 20.0 | | 1,500 | 205 | 44 | 90 |

[1] Based on reactant passed in.

Example 24

Tests performed using similar conditions as in previous examples, except that bromine was used instead of iodine, produced bromopyridines.

Examples 25–31

Propylidene ethylamine, entrained in a stream of nitrogen, and iodine, entrained in a mixture of oxygen and nitrogen were passed separately into a quartz reactor and mixed just before passing over a catalyst. The mole ratios of the reactants were: propylidene ethylamine 1.0, iodine 0.15, and oxygen 1.0 and the space velocity (defined as the gaseous volumes of proplidene ethylamine at 0° C. and 1 atmosphere which pass through the reactor per hour per unit volume of catalyst) was approx. 40.

The catalyst components were deposited on an alumina carrier. Catalysts and yields of pyridine are listed in Table II.

TABLE II

| Ex. No. | Catalyst | Pyridine, percent |
|---|---|---|
| 25 | $V_2O_5$, 10; $CrO_3$, 5.6; $Al_2O_3$, 84.4 | 19.4 |
| 26 | $Al_2O_3$, 100 | 20.8 |
| 27 | $V_2O_5$, 10; $Al_2O_3$, 90 | 11.3 |
| 28 | $CrO_3$, 10; $Al_2O_3$, 90 | 11.8 |
| 29 | Ni as the oxide, 5%, $Al_2O_3/SiO_2$ | 26.2 |
| 30 | $V_2O_5$, 10; $CrO_3$, 5.6; KOH, 5; $Al_2O_3$, 79.4 | 19.4 |
| 31 | Quartz Chips | 24.8 |

We claim:

1. A process for the preparation of pyridine or a hydrocarbyl substituted pyridine wherein an amine selected from the group consisting of primary, secondary and tertiary alkyl amines and alkyl alkylidene amines, wherein said amines have at least 5 carbon atoms and wherein each alkyl or alklidene group therein has no more than 5 carbon atoms, is heated with iodine in the vapor phase at a temperature in the range from 300° C. to 800° C.

2. A process as claimed in claim 1 in which the amine is a primary or secondary alkyl amine or an alkyl alkylidene amine derivable by condensation of an aldehyde with a primary amine.

3. A process as claimed in claim 1 in which the reaction temperature is maintained between 350° and 650° C.

4. A process as claimed in claim 2 in which oxygen is introduced into the reaction medium with one of the reactants or separately.

5. A process as claimed in claim 1 in which the iodine and amine are entrained in an inert diluent gas.

6. A process as claimed in claim 1 wherein the amine is selected from the group consisting of ethylidene propylamine, propylidene ethylamine and propylidene propylamine.

References Cited

Meisenheimer: Chem. Ber, 46: 1148–53 (1913).

James et al.: J. of the Chem. Soc., 105: 1427–36 (1914).

Fieser et al.: Adv. Org. Chem. (Reinhold, New York, 1961), p. 497.

HENRY R. JILES, Primary Examiner

C. M. SHURKO, Assistant Examiner

U.S. Cl. X.R.

260—283, 296, 297